(No Model.)
J. C. ANDERSON.
HOLLOW BRICK WALL.
No. 467,490. Patented Jan. 26, 1892.
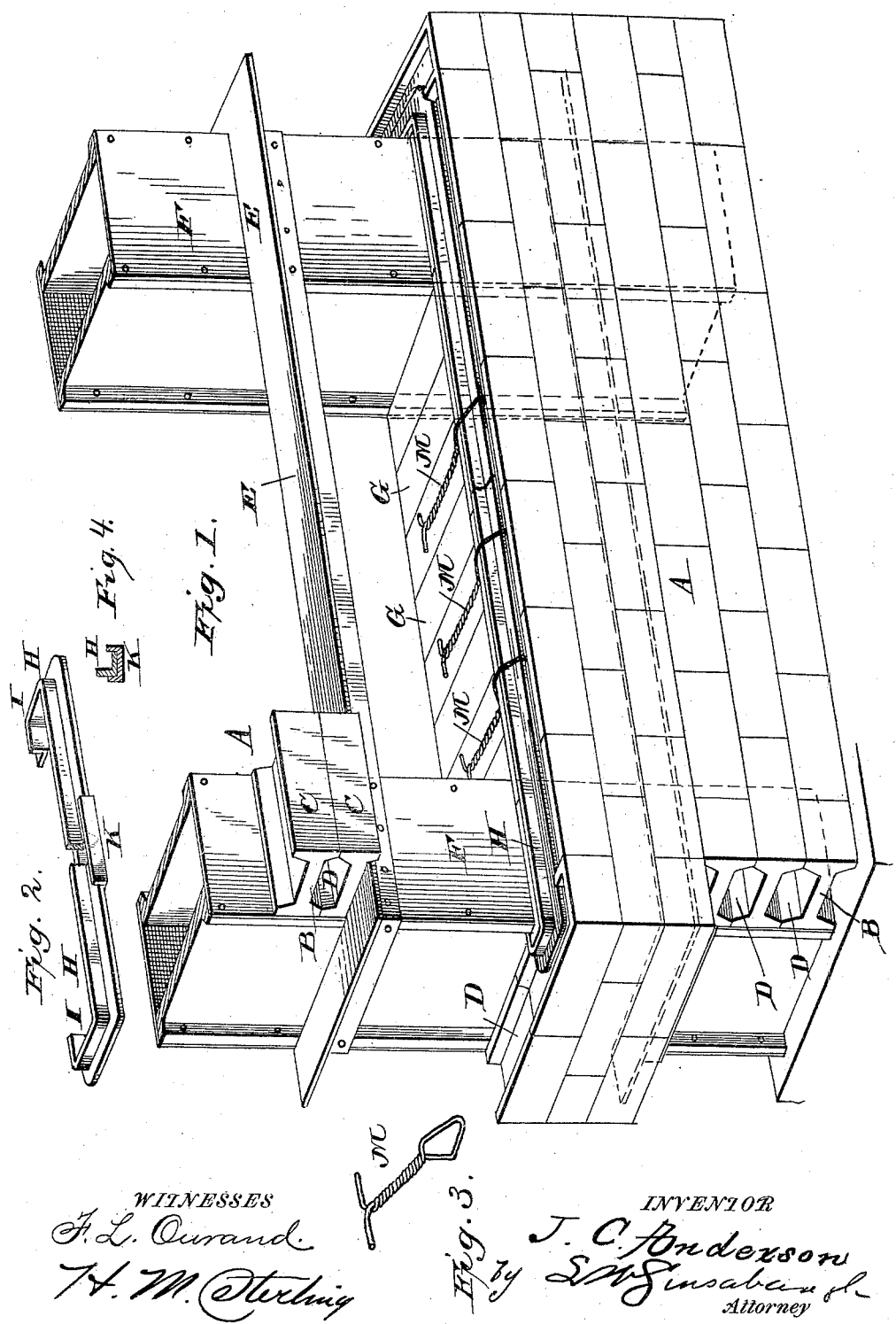
WITNESSES
F. L. Ourand
H. M. Sterling
INVENTOR
J. C. Anderson
by S. W. Insabaugh
Attorney
THE NORRIS PETERS CO., PHOTO-LITHO., WASHINGTON, D. C.

UNITED STATES PATENT OFFICE.

JAMES C. ANDERSON, OF HIGHLAND PARK, ILLINOIS.

HOLLOW BRICK WALL.

SPECIFICATION forming part of Letters Patent No. 467,490, dated January 26, 1892.

Application filed November 26, 1890. Serial No. 372,695. (No model.)

*To all whom it may concern:*

Be it known that I, JAMES C. ANDERSON, a citizen of the United States, and a resident of Highland Park, in the county of Lake and State of Illinois, have invented new and useful Improvements in Hollow Brick Walls; and I do hereby declare the following to be a full, clear, and exact description of said invention, reference being had to the accompanying drawings, and to the letters of reference marked thereon, which form a part of this specification.

My invention relates to the construction of the outer walls of buildings, and more particularly to high fire-proof buildings, where great strength, solidity, and close surface texture is a requisite.

In order to obtain a more concise view of the state of the art in this connection, I will first explain that the rapid advancement in the art of production of steel channel-beams suitable for the construction of the skeletons or frame-work of high buildings and the great demand for them in the large cities in the utilization of ground-space for buildings has brought us face to face with a new requirement for a suitable outer-wall covering which shall afford the proper weather-surface, not only to act as a barrier against the storms, rains, snows, and freezings, but also to protect the steel skeleton from the action of fire, essential in this kind of structure, and at the same time to present a surface to the general atmosphere of the city that will in the most effectual manner shed the moisture of the atmosphere and resist the constantly-increasing smoke and noxious gases incident to a growing city. It will be understood, also, in this connection that these buildings, for the most part, under the present state of the art, must be constructed of terra-cotta or burnt clay in various forms for the reason that such material is necessary to render this kind of structure fire-proof, and in order to reduce the weight of the structure to the minimum and to properly distribute the load of these high buildings upon the steel channels of the skeleton or metal frame-work it is highly desirable that the terra-cotta of the various kinds be as light as possible. This is fairly met, so far as relates to the inner partition-walls and to the building between the joist-spaces of the various floors; but the ordinary hollow tile and terra-cotta products thus employed and made by what is known as the "wet process" are too frail and porous, and are entirely inadequate for the main outer walls of such buildings.

Various patents have been granted to me from time to time for the production of clay bodies for the outer walls of buildings, with the main object in view of producing these bodies with the closest possible bodily texture, so as to resist the osmotic action of the atmosphere and at the same time give to the walls of the building solidity, strength, and durability, and in which I have explained the difficulties met with in pressing large clay bodies into form out of dry clay powder and alleged the advantages to be gained in the compactness and solidity of these clay bodies where a uniform pressure could be brought upon the dry clay powder in the production of thin slabs. I have also shown products for which patents were granted to me for hollow brick having a body of ribs or thin slabs, but such latter-named bodies have been exceedingly difficult of production in a practical way, owing to their peculiar shape and to the difficulties then met with in molding such articles, which are necessarily formed in high relief without corresponding depressions, and no means have been heretofore provided for pressing articles from dry clay in high relief without depressions—*i. e.*, having their flanges extending well outward therefrom.

To these ends my invention consists in the novel construction, arrangement, and combination of parts, as hereinafter disclosed.

By my present invention I am enabled to reduce to the minimum the size and weight of the brick-body without impairing or diminishing the standard face or weather-surface of the same by molding such brick in double bold-relief in the form of I-beams when viewed in cross-section, and at the same time giving to the spaces or hollow parts of the walls the maximum size and a suitable form in this kind of brick for pocketing a series of binding-bars, hereinafter described, for firmly binding the facing-brick to the flanges of the posts of the skeletons of the building and to the common brick of the rear part of the wall.

Referring to the drawings, Figure 1 is a view in perspective of a section of a wall, showing the bricks partly laid in to form a hollow wall, also showing my means for binding the wall to the steel posts or frame-work of the building. Fig. 2 is a perspective view of a set of binding-bars detached from the wall and means for coupling them together. Fig. 3 is a view in perspective of a binding-wire detached from the walls and binding-bars. Fig. 4 is a detailed sectional view taken through the clamp and binding-bars.

The brick A is formed in the shape of an I-beam, when viewed in cross-section, having a web or central part B and having flanges C extending along the full front and rear faces of the brick, said flanges projecting above and below the web B a like distance, so that when two or more of these bricks are laid side on side the impingement or bed of the respective bricks one on the other will be on their flanges, so as to form the openings or ducts D, as shown plainly in Fig. 1 of the drawings.

E is a bed-plate of angle iron or steel, which is securely riveted or bolted to the steel posts F of the skeleton.

In laying up the walls the bricks A have their bearing upon the bed-plate E and are laid one upon the other as stretchers in successive longitudinal rows, allowing the flanges to receive the mortar and form the joints between contiguous bricks.

G are common hollow brick which go to make up the rear portion of the wall. These common brick G have their bearings also upon iron or steel angle-bars (not shown) and are laid up in header and stretcher courses to the full thickness of the wall desired.

H are plates of angle-steel placed in the longitudinal trough or duct D, formed by the hollow of the bricks A. Each of these angle-bars is bent at one of its ends, so as to conform to the flange of the post F, as shown at the points I, and also has a shoulder for bearing against the inner flange C of the facing-brick.

K is a clamp-bar of channel-steel of a suitable width and adapted to receive and pocket the angle-bar H, so as to form an adjustable joint in the bars H, and thus permit a longitudinal adjustment of these bars to the span of the posts.

Binders M are formed of twisted wire, so as each to form a loop to conform to and slide onto the bar H and of suitable length so as to extend backward in the mortar course into the rear wall of the common brick G, thus forming an additional binding-support between the front and rear walls, as shown plainly in the drawings. These binding-bars H should be inserted at about every sixth course throughout the wall.

What I claim is—

1. The two-part binding-bars H, having the bent portion I and adjusting channel or splice bar K, substantially as described.

2. The combination, with the wall of common bricks and facing-bricks and the right-angled bar, of the twisted and looped binding-wire extending into the wall and having its loop adapted to encompass said bar, substantially as set forth.

In testimony whereof I affix my signature in presence of two subscribing witnesses.

J. C. ANDERSON.

Witnesses:
 I. J. SHUART,
 J. C. CUSHMAN.